UNITED STATES PATENT OFFICE.

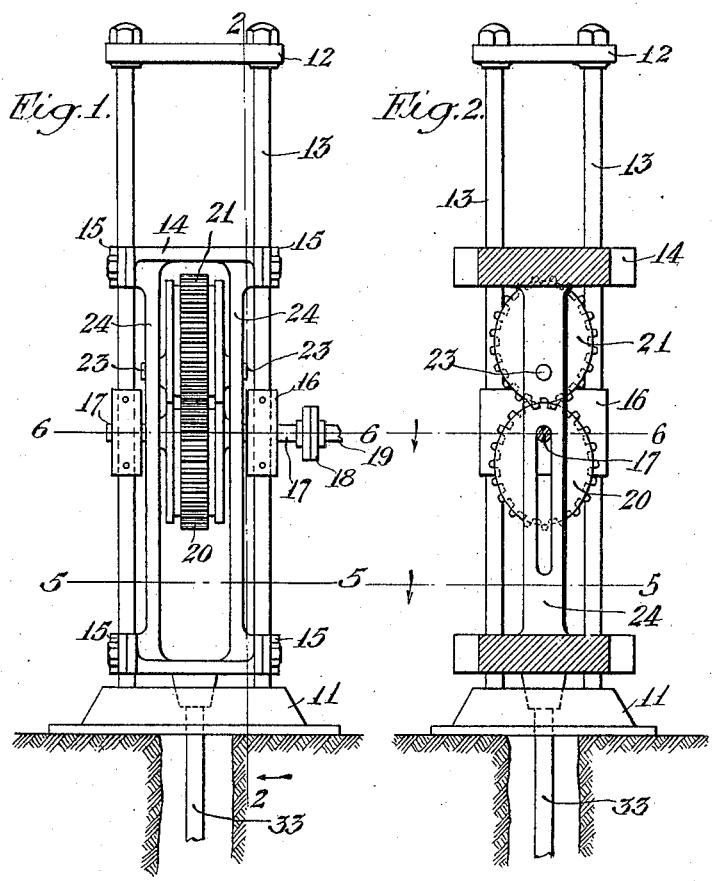

ARCHILLES A. BARTON, OF GLENDALE, CALIFORNIA.

PUMP.

1,318,130. Specification of Letters Patent. Patented Oct. 7, 1919.

Application filed November 14, 1918. Serial No. 262,601.

*To all whom it may concern:*

Be it known that I, ARCHILLES A. BARTON, a citizen of the United States, residing at Glendale, in the county of Los Angeles and State of California, have invented a new and useful Pump, of which the following is a specification.

My invention relates to pumps, and the principal object of the invention is to provide a pump head by means of which a long stroke may be obtained by a comparatively simple mechanism.

Further objects and advantages will be made evident hereinafter.

Referring to the drawings, which are for illustrative purposes only,

Figure 1 is a front elevation of a pump head embodying my invention with the pump rod in its extreme lower position.

Fig. 2 is a cross-section on a plane represented by the line 2—2 of Fig. 1, this plane being viewed in the direction of the arrows.

Fig. 3 is a diagrammatic view of the gears employed.

Fig. 4 is a plan view of Fig. 1.

Fig. 5 is a section on a plane represented by the line 5—5 of Fig. 1, this plane being viewed in the direction of the arrows, the base being omitted for the sake of clearness.

Fig. 6 is a section on a plane 6—6 of Fig. 1, all parts beyond this plane being omitted for the sake of clearness.

Fig. 7 is an enlarged view showing the construction of the gears.

As illustrated the pump consists of a base 11 and a top 12 joined by four cylindrical rods 13, these rods serving as guides for a reciprocating frame 14. This frame is provided with babbitted bearings so that it slides readily on the rods 13, caps 15 being provided on each bearing as is standard practice in the art. Bearing brackets 16 are rigidly secured on the rods 13 and a drive shaft 17 turns therein, this drive shaft being connected by means of a coupling 18 with an auxiliary drive shaft 19 driven from any suitable source of power. Keyed on the shaft 17 is a driving gear 20. This gear may be cylindrical or it may be elliptical as shown, or it may be of an irregular cam shape as will be readily understood from the following description.

The gear 20 meshes with an upper driven gear 21. This gear is identical in shape with the gear 20 and is mounted on a shaft 23 which turns freely in upright portions 24 of the frame 14. Both of the gears 20 and 21 are formed as shown in Fig. 7, in which a tooth 30 is shown, this tooth 30 having an open space 31 on either side thereof and a shroud 32 which coincides with the pitch line of the teeth. A pump rod 33 is secured to the bottom of the frame and extends down into the well in accordance with standard practice.

The method of operation of the invention is as follows:

The shaft 17 being driven from any suitable source not shown, the gear 20 rotates with this shaft at the same time rotating the gear 21 by means of the teeth 30. At the same time the weight of the pump rod and its attached parts is carried on the shrouds 32 of the gears 20 and 21 which roll together practically without friction. As the gear 20 turns through a distance of 180 degrees the gear 21 is also turned through this same distance and the pump rod 33 is lifted exactly twice the distance that it would be were a cam used having dimensions equivalent to that of the gear 20. This lifting is accomplished practically without friction as there is no sliding motion between the shrouds 32 of the gears 20 and 21 and practically no sliding motion on the teeth of these gears if they are properly constructed. The pump head can therefore be raised and lowered with a minimum of frictional losses and with a very long stroke as compared to the stroke of a cam driven pump.

It will be noted that the shrouds 32 are in effect cams which are held and driven in their proper relative position by the gears 20 and 21. Obviously the gears and cams might be associated in different relationship without departing from the spirit of my invention.

The construction of the head 14 gives a very long bearing between the upper caps 15 and the lower caps 15 so that there is little liability of the pump jamming or getting out of alinement. The gears 21 and 22, being of identical construction, can be cheaply produced in quantity and their shape can be varied to suit conditions.

While I have shown a single acting pump using elliptical gears it is obvious that duplex or triplex pumps may be constructed embodying my invention and that in such cases it may be advisable to change the shape of the gears 20 and 21 to allow the stroke of the different buckets to overlap and produce a uniform rate of flow of the water through the pump column as is generally considered advisable in pump practice.

I claim as my invention:—

1. In a pump, a pump head comprising a stationary structure; a reciprocating frame; means for guiding said frame in said structure in a line parallel to the axis of well; a driving shaft turning in bearings fixed with relation to said structure; a driving gear eccentrically mounted on and turning with said driving shaft; a driven shaft turning in bearings secured to said reciprocating frame; and a driven gear located above and meshing with said driving gear and rigidly fixed to said driven shaft.

2. In a pump, a pump head comprising a stationary structure; a reciprocating frame; means for guiding said frame in said structure in a line parallel to the axis of the well; a driving shaft turning in bearings fixed with relation to said structure; a driving gear eccentrically mounted on and turning with said driving shaft; a driven shaft turning in bearings secured to said reciprocating frame; and a driven gear located above and meshing with said driving gear and rigidly and eccentrically fixed to said driven shaft.

3. In a pump, a pump head comprising a stationary structure; a reciprocating frame; means for guiding said frame in said structure in a line parallel to the axis of the well; a driving shaft turning in bearings fixed with relation to said structure; a driving gear eccentrically mounted on and turning with said driving shaft; a driven shaft turning in bearings secured to said reciprocating frame; and a driven gear located above and meshing with said driving gear and rigidly fixed to said driven shaft, said driving and driven gears being of identical contour.

4. In a pump, a pump head comprising a stationary structure; a reciprocating frame; means for guiding said frame in said structure in a line parallel to the axis of the well; a driving shaft turning in bearings fixed with relation to said structure; a driving gear eccentrically mounted on and turning with said driving shaft; a driven shaft turning in bearings secured to said reciprocating frame; and a driven gear located above and meshing with said driving gear and rigidly and eccentrically fixed to said driven shaft, said driving and driven gears being of identical contour.

5. In a pump, a pump head comprising a stationary structure; a reciprocating frame; means for guiding said frame in said structure in a line parallel to the axis of the well; a driving shaft turning in bearings fixed with relation to said structure; a driving gear eccentrically mounted on and turning with said driving shaft; a driven shaft turning in bearings secured to said reciprocating frame; and a driven gear located above and meshing with said driving gear and rigidly fixed to said driven shaft, said driving gear having a non circular contour.

6. In a pump, a pump head comprising a stationary structure; a reciprocating frame; means for guiding said frame in said structure in a line parallel to the axis of the well; a driving shaft turning in bearings fixed with relation to said structure; a driving gear eccentrically mounted on and turning with said driving shaft; a driven shaft turning in bearings secured to said reciprocating frame; and a driven gear located above and meshing with said driving gear and rigidly and eccentrically fixed to said driven shaft, said driving gear having a non circular contour.

7. In a pump, a pump head comprising a stationary structure; a reciprocating frame; means for guiding said frame in said structure in a line parallel to the axis of the well; a driving shaft turning in bearings fixed with relation to said structure; a driving gear eccentrically mounted on and turning with said driving shaft; a driven shaft turning in bearings secured to said reciprocating frame; and a driven gear located above and meshing with said driving gear and rigidly fixed to said driven shaft, said driving and driven gears having a non circular contour.

8. In a pump, a pump head comprising a stationary structure; a reciprocating frame; means for guiding said frame in said structure in a line parallel to the axis of the well; a driving shaft turning in bearings fixed with relation to said structure; a driving gear eccentrically mounted on and turning with said driving shaft; a driven shaft turning in bearings secured to said reciprocating frame; and a driven gear located above and meshing with said driving gear and rigidly and eccentrically fixed to said driven shaft, said driving and driven gears having a non circular contour.

9. In a pump, a pump head comprising a stationary structure; a reciprocating frame; means for guiding said frame in said structure in a line parallel to the axis of the well; a driving shaft turning in bearings fixed with relation to said structure; a driving gear eccentrically mounted on and turning with said driving shaft; a driven shaft turning in bearings secured to said reciprocating frame; and a driven gear located above and meshing with said driving gear and rigidly fixed to said driven shaft, said driving and driven gears having shrouds which follow their pitch lines so placed as to take the weight of the moving parts.

10. In a pump, a pump head comprising a stationary structure; a reciprocating frame; means for guiding said frame in said structure in a line parallel to the axis of the well; a driving shaft turning in bearings fixed with relation to said structure; a driving gear eccentrically mounted on and turning with said driving shaft; a driven shaft turning in bearings secured to said reciprocating frame; and a driven gear located above and meshing with said driving gear and rigidly and eccentrically fixed to said driven shaft, said driving and driven gears having shrouds which follow their pitch lines so placed as to take the weight of the moving parts.

11. A pump driving mechanism comprising a driving shaft turning in bearings fixed with relation to the stationary structure of the pump; a driven shaft carried in the movable member of the pump; a driving cam eccentrically fixed to the driving shaft; a driven cam eccentrically fixed to the driven shaft; and means independent of said cams by which the driving shaft rotates the driven shaft.

12. A pump driving mechanism comprising a driving shaft turning in bearings fixed with relation to the stationary structure of the pump; a driven shaft carried in the movable member of the pump; a driving cam eccentrically fixed to the driving shaft; a driven cam eccentrically fixed to the driven shaft; and gearing by which the driving shaft rotates the driven shaft.

In testimony whereof, I have hereunto set my hand at Los Angeles, California, this 23rd day of September, 1918.

ARCHILLES A. BARTON.

Copies of this patent may be obtained for five cents each, by addressing the "Commissioner of Patents, Washington, D. C."